Dec. 18, 1934.  F. A. PARKHURST  1,984,805

PROCESS FOR MAKING TOOTHBRUSH HANDLES

Filed June 20, 1933

Inventor:
Frederic A. Parkhurst
by Macleod, Calver, Copeland & Dike
Attys.

Patented Dec. 18, 1934

1,984,805

UNITED STATES PATENT OFFICE 1,984,805

PROCESS FOR MAKING TOOTHBRUSH HANDLES

Frederic A. Parkhurst, Bethesda, Md., assignor to Pro-Phy-Lac-Tic Brush Company, Northampton, Mass., a corporation of Delaware Application June 20, 1933, Serial No. 676,668

7 Claims. (Cl. 18—55)

My invention relates to tooth brush handles made of plastic material such, for example, as pyroxylin, and more particularly to a process for making such handles.

One of the objects of my invention is to provide a new process for manufacturing tooth brush handles which eliminates entirely the use of molds and molding apparatus together with their expensive die members, and one which can be carried out at a low manufacturing or operating cost and in a relatively small amount of floor space.

Another object of my invention is to provide a process whereby the waste of material from scrap is reduced to a minimum, and one which is sufficiently flexible to permit a quick change-over from one design of handle to a different design without involving costly replacements in the apparatus and equipment.

A further object of my invention is to provide an inexpensive and comparatively simple process capable of producing tooth brush handles of attractive appearance having all of the characteristics and advantages of handles made in accordance with previous expensive molding processes.

Other objects of my invention will appear from the following description and appended claims when considered in conjunction with the accompanying drawing forming a part of this specification.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Heretofore, the processes for manufacturing tooth brush handles formed from plastic material have all required the use of expensive and complicated molding apparatus and associated costly die members, which, in addition to requiring a great amount of floor space to accommodate this costly and cumbersome equipment, necessitated also replacements of the costly die members, when and if it became necessary or desirable to make any change whatever in the design of the handle.

As pointed out above, one of the important advantages of my process is that it permits the manufacture of tooth brush handles formed of plastic material without the use of any molding apparatus and associated dies, and permits the mass production of superior tooth brush handles which are attractive in appearance and which have all of the characteristics and advantages of the previous tooth brush handles.

Figure 1:
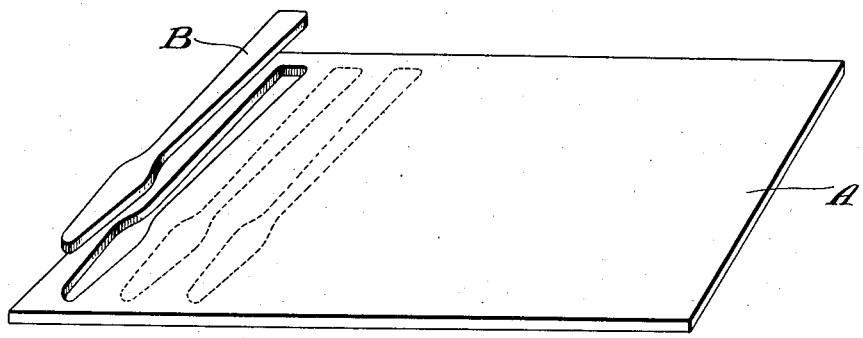
Fig. 1 shows a slab or sheet of plastic material from which individual handle blanks are formed or cut.
Figure 2:
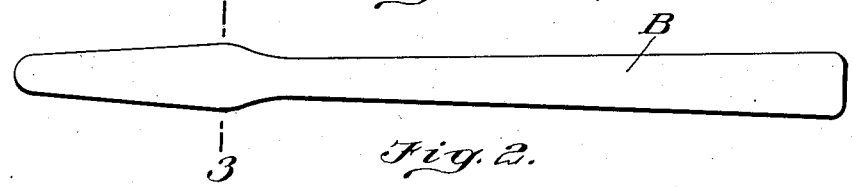
Fig. 2 is a plan view of one of the handle blanks.
Figure 3:
Fig. 3 is a cross section taken substantially along the line 3—3 of Fig. 2, on an enlarged scale.
Figure 4:
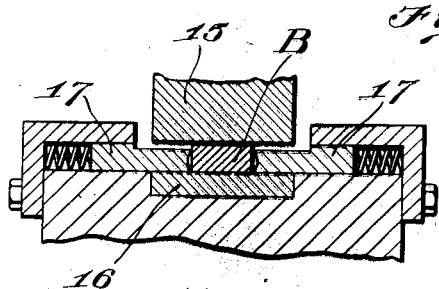
Fig. 4 is a fragmentary cross sectional view of the bulging apparatus of my invention, about to engage one of the handle blanks shown in the preceding figures.
Figure 5:
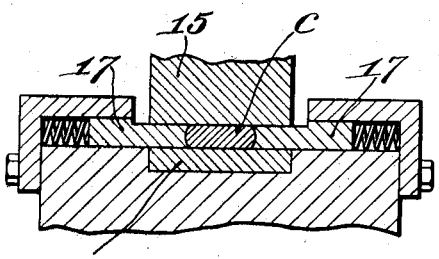
Fig. 5 is a view similar to Fig. 4 showing the handle blank in place in the apparatus after the bulging operation has been completed.
Figure 6:
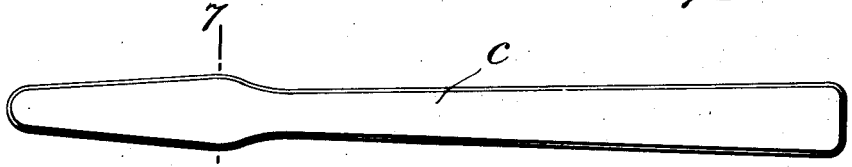
Fig. 6 is a plan view of the bulged handle blank.
Figure 7:
Fig. 7 is a cross section taken substantially along the line 7—7 of Fig. 6, on an enlarged scale.

In accordance with my process, I employ a sheet or slab of plastic material, such as pyroxylin, as shown at A in Fig. 1, which sheet or slab is heated in any suitable manner, such as by immersion in hot water. The heated sheet of plastic material is placed in a suitable machine and the individual tooth brush handle blanks are formed therefrom in any suitable manner, such as by cutting out the blanks with special cutters or drinking die members, to produce the blanks B, which in plan view, have the same shape and conformation as the finished handles. These cut or formed individual handle blanks, as shown, have flat top and bottom surfaces or faces, and sides which are perpendicular to those faces. After the blanks are cut or formed, they are engaged by a pair of oppositely disposed highly polished plates and passed to a bulging machine such as that shown in Fig. 4. The top and bottom metal plates or members 15 and 16, respectively, of the bulging machine engage the blank and chill the top and bottom surfaces or faces thereof by surface contact. These plates, as shown, have highly polished plane surfaces when it is desired to produce handles having flat top and bottom faces. If it is desired to produce handles in which the top and bottom sides or faces thereof are concave or convex, the surfaces of the plates or members 15 and 16 are shaped so as to produce the desired handle shape during the compressing and bulging operation. Relative movement of the members 15 and 16 toward one another serves to compress the blank and reduce its thickness and to simultaneously bulge the side edges of the blank around its entire contour so that the bulged blank has the appearance of that shown at C in Figs. 6 and 7. If desirable, the bulging apparatus may include a pair of guide or centering members 17 which, as shown, are spring pressed so that their tendency is to move toward one another and to engage the side edges of the handle blank. It will be understood that as the members 15 and 16 move toward one another, thereby bulging the side edges of the blank, the guide members 17 are free to move outwardly against the action of their springs. Thus it will be seen, that the sole function and purpose of the members 17 is to position or center the handle blank to assure its remaining straight during the bulging operation. While I have shown a bulging machine including centering members or guides, it will be understood that these members can be eliminated without affecting the formation of perfect handles.

I have discovered that by maintaining a differential in the temperature between the top and bottom surfaces of the handle blank and the interior or center thereof, that I obtain a more perfect and even bulge at the side edges. Ordinarily, the mere contact of the cold metal members 15 and 16 with the top and bottom faces or surfaces of the blank, is sufficient to chill these surfaces to assist in a perfect bulging of the side edges of the blank, it being understood that the material at the interior or center of the blank retains a portion of the original heat imparted to it in the preliminary heating of the blank by immersion. If desirable, I can deliberately chill the top and bottom surfaces of the blank, which can be done in any suitable manner. Likewise, if desirable, I can deliberately heat the centers of the handle blanks after they have issued from the cutting operation and while they are being transferred to the bulging operation.

I have not attempted to show in detail any particular machine for accomplishing the several operations of my process, other than to show one form of bulging apparatus for performing the bulging operation. My invention is directed to a new process which can be carried out by means of any suitable machinery adapted for this purpose. The several operations above described are preferably performed in a single machine, although they can be carried out in separate machines.

After the blanks have issued from the bulging operation, they are ready to be subjected to the finishing operations such, for example, as drilling and countersinking the eye in the end of the handle, tumbling, ashing, polishing, applying the monogram by stamping or in any other suitable manner, coating with lacquer, baking to set the lacquer, and thereafter drilling the head portion of the handle and stapling to set the tufts of bristles. All of these last mentioned operations may be carried out in any suitable manner and with any sort of machinery adapted for this purpose. They do not constitute a part of my present process.

I have shown, merely for purposes of illustration, a tooth brush handle having a neck portion and a bulging machine provided with suitable spring pressed guides for producing such a handle. If it is desirable to produce a so-called neckless tooth brush handle, that is one having straight sides or edges, it is merely necessary to change the cutters or dinking dies to cut a blank having straight sides and to substitute for the curved guide members in the bulging machine, guide or centering members which have straight sides. Therefore, the change-over from one design of handle to another design can be accomplished very quickly and without dismantling the apparatus. This feature of my process adapts it for use in manufacturing tooth brush handles formed of plastic material in any desired shape, at a minimum expense and with a minimum of effort and time involved in making the necessary changes in the parts.

I claim:

1. The process for manufacturing tooth brush handle blanks formed of plastic material which comprises, forming an individual handle blank having sides perpendicular to its top and bottom faces, and compressing the blank to produce a convex bulge extending continuously along its side edges.

2. The process for manufacturing tooth brush handles which comprises, cutting individual handle blanks from a sheet of plastic material in which the sides of the blanks are perpendicular to their top and bottom faces, and thereafter compressing the blanks and simultaneously producing a convex bulge extending continuously along their side edges.

3. The process of manufacturing tooth brush handles formed of plastic material which comprises, heating the plastic material, forming individual handle blanks from the material in which the blanks have sides perpendicular to their top and bottom faces, chilling the top and bottom faces of the blank and simultaneously bulging its side edges.

4. The process for manufacturing tooth brush handles formed of plastic material and having their longitudinal side walls formed with a bulging surface which comprises, heating a sheet of plastic material, forming individual handle blanks having sides perpendicular to the top and bottom faces thereof from said heated material, and compressing the blanks to form a bulging side edge throughout the length of the handle.

5. The hereindescribed process for making tooth brush handles, which comprises heating a sheet of plastic material, cutting the individual handle blanks having sides perpendicular to their top and bottom faces from the sheet while heated, chilling the top and bottom surfaces of the blanks and simultaneously compressing them to bulge their side edges.

6. The hereindescribed process for making tooth brush handles of plastic material which comprises, heating a slab of plastic material and cutting individual handle blanks therefrom while the slab remains heated, and thereafter compressing the blank by applying pressure to two of its opposed faces to simultaneously produce a convex bulge on the other pair of opposed faces extending around the entire contour of said blank.

7. The process of forming a handle blank of plastic material, which comprises forming an individual handle blank having sides perpendicular to its top and bottom faces, compressing the blank while it is plastic to cause the side edges to bulge along the sides of the handle and form them by the unrestrained flow of the material, and then hardening the material in the shape imparted to it by the compression.

FREDERIC A. PARKHURST.